Aug. 27, 1968 A. E. MARTENS 3,399,347
PHOTOELECTRIC SYSTEM FOR GENERATING A SIGNAL PROPORTIONAL
TO THE MOVEMENT OF A METER
Filed Jan. 9, 1964 2 Sheets-Sheet 1

ALEXANDER E. MARTENS
INVENTOR.

BY Arthur L. Nelson
Frank C. Parker
ATTORNEYS

Aug. 27, 1968   A. E. MARTENS   3,399,347
PHOTOELECTRIC SYSTEM FOR GENERATING A SIGNAL PROPORTIONAL
TO THE MOVEMENT OF A METER
Filed Jan. 9, 1964   2 Sheets-Sheet 2

ALEXANDER E. MARTENS
INVENTOR.

BY

ATTORNEYS

United States Patent Office 3,399,347
Patented Aug. 27, 1968

3,399,347
PHOTOELECTRIC SYSTEM FOR GENERATING A SIGNAL PROPORTIONAL TO THE MOVEMENT OF A METER
Alexander E. Martens, Greece, N.Y., assignor to Bausch & Lomb Incorporated, Rochester, N.Y., a corporation of New York
Filed Jan. 9, 1964, Ser. No. 336,764
4 Claims. (Cl. 324—96)

ABSTRACT OF THE DISCLOSURE

A disk including two portions therein, such as wedges, having different optical properties than the remainder of the disk, is coupled to rotate with a meter movement. Radiation from a source is transmitted to the disk. Radiation from the disk is directed towards a pair of photodetectors that generate a signal proportional to the position of the meter.

---

Electrical meters measure an electrical quantity such as voltage, or amperage by tapping a portion of the electrical energy from the electrical circuit. The input signal to the meter does not, however, appreciably affect the electrical energy in the circuit being measured. It may be desirable to not only have a visible indication or measurement, but also have a readout of proportional error signal from the meter which can be used to control a subsequent process. To prevent an interaction between the measuring and control functions the input signal to the meter should be separate from the readout proportional error used for control of remote readout purposes. By separating these two functions it is possible to provide a proportional error output signal without affecting the meter function to control a subsequent process in accordance with an electrical function being measured. This invention provides a meter indication of value measured and a large proportional error output signal without impairing meter operation.

It is an object of this invention to provide an electrical meter output which is entirely separate from the meter input.

It is another object of this invention to provide an electrical meter having a visible indicator of an electrical measurement and simultaneously provide an electrical readout suitable for any control or remote readout purpose.

It is a further object of this invention to provide an electrical meter having a visible indicator and simultaneously provide a photoelectric output for control or remote readout purpose without any drain on the input signal to the meter, beyond the normal current required for indicating purpose.

It is a further object of this invention to provide a visible indicator on an electrical meter and a separate and simultaneous electrical DC output having magnitude and polarity, or AC output with amplitude and phase proportional to the magnitude and direction of the deviation of the measured parameter from a predetermined value.

The objects of this invention are accomplished by providing a meter having a visual means indicating the magnitude of a direct current electrical signal while simultaneously providing a readout signal which is separate from the visual indicator. The axis of the meter pointer carries an optically coded disc or cylinder. The coding is so arranged that the nature and intensity of the light passing through or reflected from the coded areas contains the information regarding the direction and magnitude of the deviation of the measured parameter from a predetermined value. The light impinging upon the photosensitive devices generates an electrical signal which therefore also contains the error information.

The preferred embodiments of this invention are illustrated in the attached drawings which are subsequently described and the advantages will be apparent to one skilled in the art.

Figure 1:
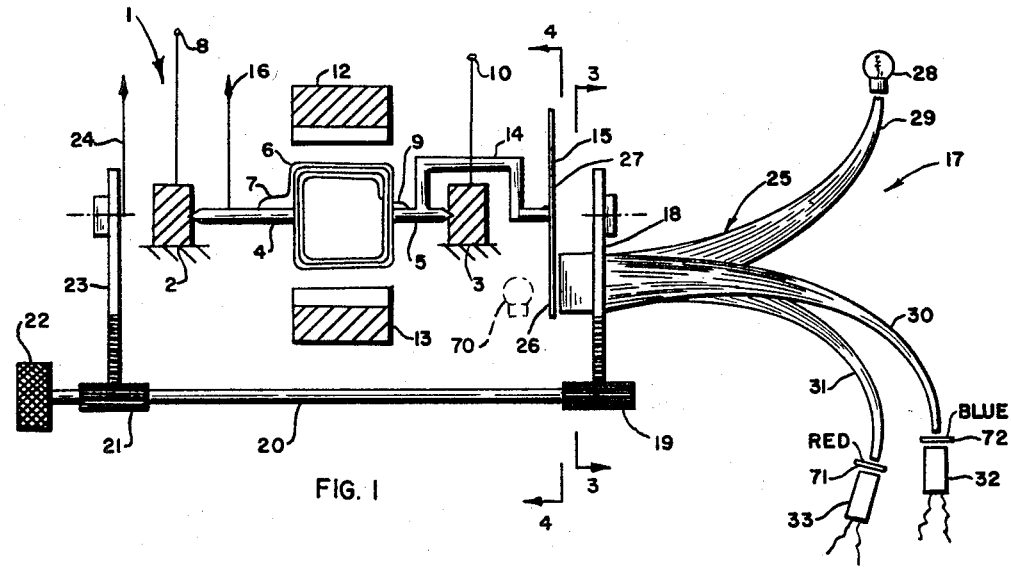
FIG. 1 is an illustration of the meter and the photoelectric readout for a meter control system.

Referring to the drawings FIG. 1 illustrates a meter adapted for use with a readout system. The readout system uses a source of light and a reflector plate which reflects a signal through light conductors to photocells which are sensitive to wavelengths of predetermined values.

The meter 1 includes two needle bearings 2 and 3 carrying the shafts 4 and 5. The shaft 4 is insulated from the shaft 5 and the ends of each of the shafts form a needle point received in the mating bearing structure of the bearings 2 and 3. The coil 6 has one lead 7 connected to the shaft 4 and the outlet terminal 8 adapted for suitable external connection. The shaft 5 is connected by the lead 9 to the opposite end of the coil 6. The outlet of the shaft 5 is connected through the bearing 3 to the terminal 10. The coil 6 is supported on the shafts 4 and 5. The coil 6 is positioned parallel to the plane of the paper as illustrated in its neutral position. Two magnetic poles 12 and 13 having arcuate pole shoes which are diametrically opposed and a flux gap is formed intermediate the two poles. The coil 6 is pivotally supported intermediate the poles 12 and 13. The preceding description is used to merely indicate the meter function. Any other suitable electric meter such as taut band, moving vane, or any other type in which the pointer deflection corresponds to the value of the measured event may be utilized.

An extension 14 of the shaft 5 carries a disc 15 which rotates on the same axis as the coil 6. The disc 15 will be subsequently described with FIG. 4.

The shaft 4 carries a pointer 16 which rotates on a common axis with the meter coil 6. The whole assembly of the pointer 16, coil 6 and disc 15 rotate about a common axis in response to the input signal applied on the terminals 8 and 10. The pointer 16 gives a visible indication of the magnitude and polarity of the input signal.

The photoelectric readout system 17 includes a gear segment 18 pivoting about an axis common to the axis of rotation of the coil 6. The gear segment 18 meshes with a pinion 19 which in turn is connected by the shaft 20 to the pinion 21. A knob 22 is also connected to the shaft 20 which rotates a second gear segment 23 about an axis common to the axis of the coil 6. The position of the gear segment 18 is indicated by the pointer 24 which is integral and rotates in unison with the gear segment 23. These gear segments and the control means intermediate the gear segments provides means for the positioning of the bundle 25 and its end face 26 relative to the face 27 on the disc 15, and the face of the meter. The position of the pointer 24 relative to the face of meter indicates the preset and desired value for the measured or controlled parameter.

Figure 3:
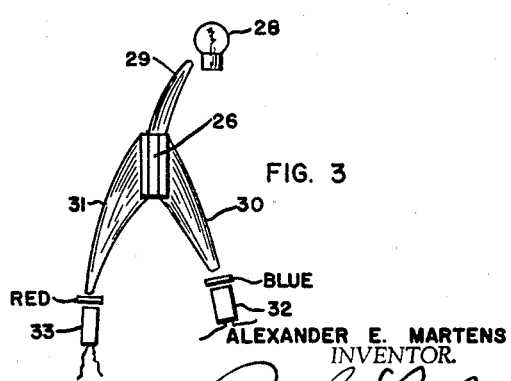
FIG. 3 is a view taken on line 3—3 of FIG. 1.

Referring to the photoelectric system 17 as illustrated in FIG. 1 and FIG. 3 the light source 28 directs light through the light input strand 29 which is a part of the bundle 25. The input strand 29 will be considered the white light strand and the light source 28 will be assumed to include a plurality of wavelengths in the visible spectrum. The radiation however, need not be limited to the visible portion of the spectrum but may operate in an invisible portion of the spectrum but the source must include a plurality of wavelengths if the light is to be reflected as illustrated in FIG. 1. The reflected light from the disc 15 is reflected into the output strands 30 and 31 which will be designated respectively as the blue light strand 30 and the red light strand 31. The photocells 32 and 33 receive blue and red light respectively and are sensitive to these respective wavelengths. To insure greater sensitivity a blue filter 72 is positioned intermediate the outlet end of the blue light strand 30 and the photocell 32 and also a red filter 71 is positioned intermediate the outlet face of the red light strand 31 and the photocell 32.

Figure 4:
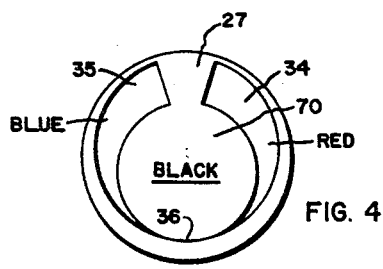
FIG. 4 is a view taken on line 4—4 of FIG. 1.

The disc 15 is preferably made of a light weight metal or plastic which is surfaced with a black non-reflecting material for its greater portion and has a red and blue reflecting area 34 and 35 formed in wedge shape as illustrated in FIG. 4. The apexes of the wedges come together at a point 36 which lies precisely opposite the direction of the pointer 16 with respect to the axis of the disc and the center of rotation of the coil 6. Depending upon the relative position of the bundle face 26 adjacent the disc 15 one or the other of the photocells 32 or 33 will receive more light if the meter indicates any deflection from the preset point. If the face 26 is exactly opposite the point 36 the relative amount of light received by either of the photocells will be equal and balance the electrical output. It is understood that while the disclosure illustrates a white light source and a red and blue light transmitting strands energizing the photocells, any combination of wavelengths and radiant flux from the source of radiation 28 and reflectors reflecting dissimilar wavelengths to the output strands would operate satisfactorily to create an electrical unbalance in the bridge circuit and provide the desired output signal.

Figure 2:
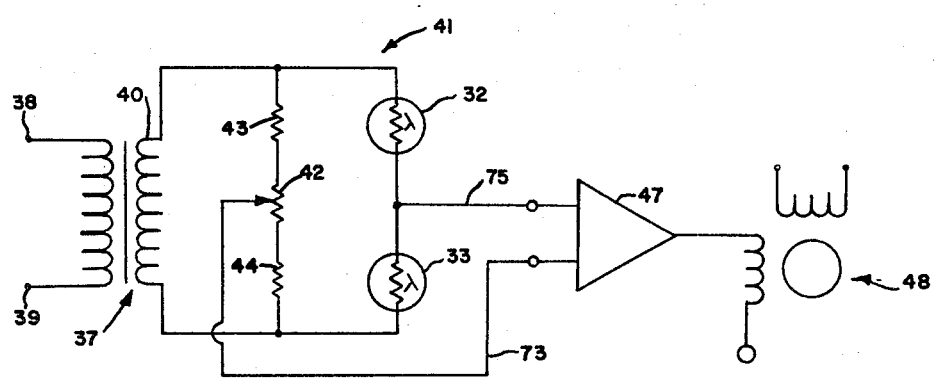
FIG. 2 is a circuit diagram utilizing the photocells illustrated in FIG. 1 in an AC bridge circuit driving a servo-system.

Referring to FIG. 2 the electrical circuit is shown. A transformer 37 is connected to a suitable source of electrical energy by the terminals 38 and 39. The secondary winding 40 of the transformer 37 energizes the bridge circuit 41 and the initial balance in the bridge circuit is set by the variable center tap resistor 42. The resistors 43 and 44 operate as arms in the bridge circuit. The ends of these two arms are connected to the secondary winding 40 and also to the arms formed by the photocells 32 and 33. The junction intermediate the photocells 32 and 33 are connected to an amplifier 47. The center tap of resistor 42 is also connected to the amplifier 47 to provide a variable input responsive to the resistivity in the photocells 32 and 33. The output from the amplifier 47 may be connected to any suitable servo system of which a servo motor 48 is illustrated having a two phase winding.

Figure 10:
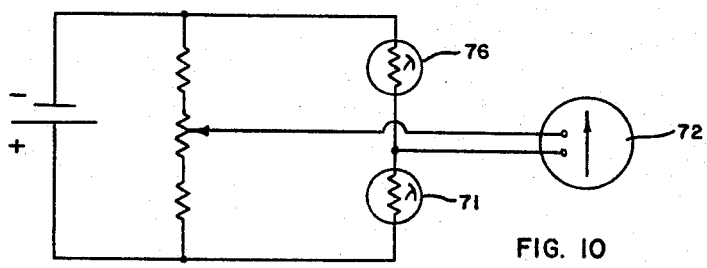
FIG. 10 is a modification of a direct current output circuit for indicating error magnitude and polarity.

FIG. 10 illustrates an electrical circuit operating from a DC source. The photocells 76 and 71 would operate in place of photocells 32 and 33 and the meter 1 would indicate a magnitude and polarity of the direct current being measured. The readout unit 72 may be an amplifier, meter, or any suitable readout circuit.

Figure 5:
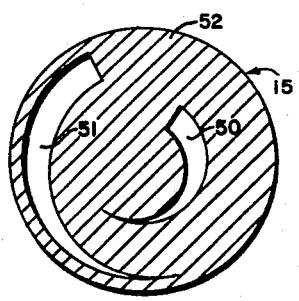
FIG. 5 is a modification illustrating a reflector disc similar to FIG. 4.

Referring to FIG. 5 a modification of the photoelectric signal generating means is illustrated. The disc 15 is illustrated with a dark area over the major portion of the surface of the disc. The wedge shaped reflecting portions 50 and 51 reflect light which is directed from the input strand 53 onto the surface 52 of the disc 15. The face 26 of the fiber bundle 25 is parallel with the face 52 of the disc 15 and is aligned with the lower portions of the wedges 50 and 51 when the needle 9 is in a neutral or non-deflected position. The input strand 53 directs light on the face 52 of the disc 15. Either the strand 54 or 55 transmits the light to photocells depending on the direction of rotation and the light may be monochromatic as each photocell receives the light from one wedge only at all times.

A further modification may be used whereby the disc 15 is opaque and the wedges 50 and 51 are transparent to permit the passage of light through the disc. Under these circumstances the light 70 would be on the opposite side of the disc from the face 26 of the fiber bundle 56. The fiber bundle 56 would be constructed of two strands in place of three and either the upper strand 57 would transmit light or the lower strand 58 would transmit light depending on the direction of rotation. The operation of the control system would be similar as that described above.

Figure 8:
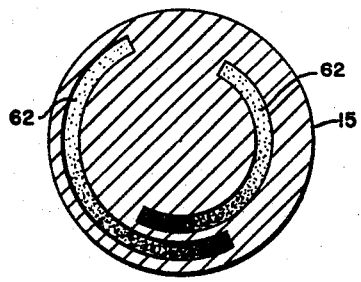
FIG. 8 is another modification of a disc similar to FIG. 4.
Figure 9:
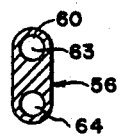
FIG. 9 is a modification of the light carrying bundle for use with the disc in FIG. 5 where the light is transmitted through a disc.

Referring to FIGS. 8 and 9 a further modification is illustrated whereby the source of light 70 would be positioned behind the disc relative to the light receiving face 60 of the bundle of light transmitting fibers 56. The disc would be constructed of an opaque light weight material in which light pervious portions 61 and 62 were formed. A variable density material would form the light transmitting areas 61 and 62 with the greater density and therefore permitting the least light transmission through the lower portions of the areas 61 and 62. The upper portions of these areas 61 and 62 would preferably provide complete transmission of light. The fiber bundle 56 would include a light transmitting strand 63 and a light transmitting strand 64 to operate photocells and an electrical circuit as previously described.

Figure 11:
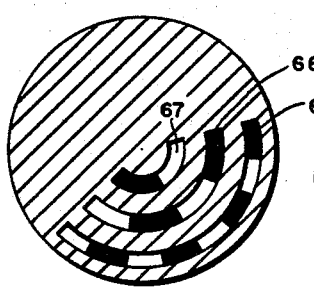
FIG. 11 is a modification of a disc to provide a digital readout.

A further modification might be devised to adapt the readout system to a digital code system. The disc illustrated in FIG. 11 is a simplified version of a binary code in the form of concentric rings 65, 66 and 67 forming light or dark areas indicating an absolute displacement value of the pointer from the initial zero and would provide an electrical signal in digital form for remote readout or control. For an example, seven concentric rings with a binary (8, 4, 2, 1) code would provide 1 in 128 resolution.

The device will be described in the following paragraphs.

Referring to FIG. 1 the meter 1 operates in response to an electrical signal applied to the terminals 8 and 10. The meter is assumed to be of a design to measure a magnitude and polarity of an electrical current corresponding to the value of the measured or controlled parameter. The poles 12 and 13 form a magnetic field in which the coil 6 rotates. The current in the coil 6 creates a deflection of the coil and the pointer 16 and a simultaneous rotation of the disc 15. The initial position of the bundle face 26 relative to the disc 15 and the meter face is controlled by the knob and the gears and indicated by the pointer 24. As an electrical signal is applied to the terminals 8 and 10 a deflection of the coil is indicated by the pointer 16 and the rotation of the disc 15 is sensed by the photoelectric system 17. The face 27 in the disc 15 is positioned parallel with the face 26 of the bundle 25 of optical light transmitting fibers. The source of light 28 projects light into the strand 29 in the bundle of fibers 25 which is directed onto the face 27 of the disc 15. The disc 15 reflects light by the reflecting wedges 34 and 35 and absorbs light by the black portion 70. The reflection of light will be red or blue depending on the wedge reflecting the light. The wedge 34 is red and therefore reflects red light and the wedge 35 is blue and therefore reflects a blue light. Assuming that the deflection of the needle 16 is clockwise a greater portion of the red wedge 34 is moved in front of the face 26 of fiber bundle 25. This in turn causes more red light to be reflected into the red light transmitting bundle 31 which is filtered by the red filter 71 and sensed by the photocell 33 which is sensitive to red light. This in turn creates an unbalance in the bridge circuit 41 which sends a signal through the electrical conductor 75 to the amplifier 47. The greater the deflection of the needle 16 the greater the unbalance of the bridge circuit 41 and the greater is the output signal.

With a signal causing a deflection of the needle 16 opposite to that described in the above paragraphs the needle 16 will be deflected in the counter-clockwise direction. This accordingly will cause the disc 15 to rotate the blue reflecting wedge 35 in front of the face 27 of the bundle 25. The blue transmitting strand 30 will then transmit light and project the light through the blue filter 72 and the light will be sensed by the photocell 32. This in turn causes an electrical unbalance of the bridge circuit 41 and generating a signal of a reverse polarity, or phase which is amplified and relayed to the servo motor 48. Accordingly, this system will provide an output signal which indicates the direction (sense) and the magnitude of the deviation of the measured parameter from a predetermined value. In the description above the operation has been described through blue light and red light strands which activate similar wavelength sensitivity photocells which is primarily for illustration only. The device as illustrated in FIGS. 1, 2, 3 and 4 will cause a slight transmission of light through the second output strand of 30 or 31 due to the reflectance of the dissimilar wedge, but the transmission of light through the blue, or red filters further limits the band width of light to the specific wavelength to which the photocell is sensitive. A modification has been set forth, however, where the light transmitted through the output bundles is limited to a single strand or two strands. These modifications will be described subsequently.

Figures 6, 7:
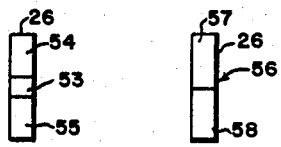
FIG. 6 is a modification of a light carrying bundle adapted for use with the disc illustrated in FIG. 5.
FIG. 7 is a light carrying bundle suitable for use with a disc as illustrated in FIG. 5 except the light is transmitted through the disc.

Referring to FIG. 5 a modification is illustrated whereby the reflecting wedges 50 and 51 are changed in their relative position on the surface 52 of the disc 15. The operation of the device in combination with the bundle as illustrated in FIG. 6 is generally similar to that described in the previous paragraphs. The basic difference being in the general arrangement of the reflecting wedges 50 and 51 and the reception surfaces on the face 26 of the bundle 25. The strand 57 or 58 receives light from the wedge 50 or 51 respectively, and in turn operates its mating photocell.

A further modification is devised whereby the light 70 is disposed behind the disc 15 and a light transmitting portion is formed by wedges 50 and 51 as illustrated. The opaque area 52 blocks light transmission. With this type of operation a bundle 56 as illustrated in FIG. 7 would be used. As the disc 15 is rotated in a clockwise direction the light transmitting wedge 50 will transmit light which is received on the strand 57 only of the bundle 56. The bundle 56 operates a photosensitive electrical circuit in the same manner as described for the initial disclosure.

Referring to FIGS. 8 and 9 the disc 15 carries variable density light transmitting slots 61 and 62. The light 70 is positioned behind the disc and transmits light through the disc according to the density of the portions of 61 and 62. The greater the deflection the greater the transmission as the density of the areas 61 and 62 decreases in its upper portion and increases in its lower portion. The operation of the photoelectric system is the same as previously described in the above paragraphs.

For a binary coded outlet the light transmission through rings 65, 66 and 67 would be controlled by a predetermined amount of deflection which would activate another strand in the bundle and thereby provide a readout system which senses a binary code output.

The above descriptions and illustrations describes the preferred modifications of this invention and it is understood that other modifications might be devised which might fall within the scope of this invention which is defined by the following attached claims.

I claim:
1. A photoelectric system for use with electrical meter movement for generating an electrical signal proportional to the position of said meter movement comprising:
   a disk mounted for rotation with said meter movement, said disk includes first and second wedge shaped portions having different optical properties than the remainder of said disk, said wedge shaped portions being curved so that their centers are disposed substantially concentric with the axis of rotation of said disk and are positioned to expand in opposite directions;
   a source of radiation;
   first and second photodetectors connected in an electrical circuit;
   first means for directing radiation from said source towards said first and second wedge shaped portions;
   second means for directing radiation from portions of said first and second wedge shaped portions towards said first and second photodetectors so that said photodetectors generate an electrical signal proportional to the magnitude and direction of movement of said disk with respect to a reference position, and
   means for adjusting said reference position.
2. A photoelectric system as defined in claim 1 wherein:
   said wedge shaped portions reflect dissimilar wavelengths of radiation;
   said first means comprises an optical fiber bundle for directing radiation from said source towards said wedges for reflection therefrom;
   said second means comprises an optical fiber bundle directing radiation from said first wedge towards said first photodetector and from said second wedge towards said second photodetector, and
   said means for adjusting said reference position changes the position of said optical fiber bundles.
3. A photoelectric system as defined in claim 1 wherein:
   said wedge shaped portions are transparent to radiation and are unequally displaced from the axis of rotation of said disk,
   said second means comprises an optical fiber bundle directing radiation from said first wedge towards said first photodetector and from said second wedge towards said second photodetector, and
   said means for adjusting said reference position changes the position of said optical fiber bundle.
4. A photoelectric system for use with an electrical meter movement for generating an electrical signal proportional to the position of said meter movement comprising:
   a disk mounted for rotation with said meter movement, said disk includes first and second radiation transmitting curved portions disposed substantially concentric with the axis of rotation of the disk, said curved portions having a variable optical density and are located on opposite parts of the disk so that the points of maximum and minimum optical density of one portion are adjacent corresponding points of the other portion;
   a source of radiation;
   first and second photodetectors connected in an electrical circuit;
   first means for directing radiation from said source towards said first and second curved portions;
   second means for directing radiation from portions of said first and second curved portions towards said first and second photodetectors respectively so that said photodetectors generate an electrical signal proportional to the magnitude and direction of movement of said disk with respect to a reference position,
   and third means for adjusting said reference position.

(References on following page)

References Cited

UNITED STATES PATENTS

| | | | |
|---|---|---|---|
| 1,750,242 | 3/1930 | Ostrolenk | 250—231 X |
| 2,065,421 | 12/1936 | Bernarde | 250—231 X |
| 2,122,818 | 7/1938 | Ladrach | 250—231 X |
| 2,604,528 | 7/1952 | Obermaier | 250—231 X |
| 2,749,501 | 6/1956 | Bartlett | 250—226 X |
| 3,054,928 | 9/1962 | Schrenk | 324—99 X |
| 3,118,087 | 1/1964 | Eisenberg | 324—96 X |
| 3,234,394 | 2/1966 | Worden | 250—231 X |
| 3,249,759 | 5/1966 | Sendro | 324—96 X |
| 3,290,593 | 12/1966 | Crowdes | 324—96 |

RUDOLPH V. ROLINEC, *Primary Examiner.*

G. R. STRECKER, *Assistant Examiner.*